Patented Feb. 24, 1942

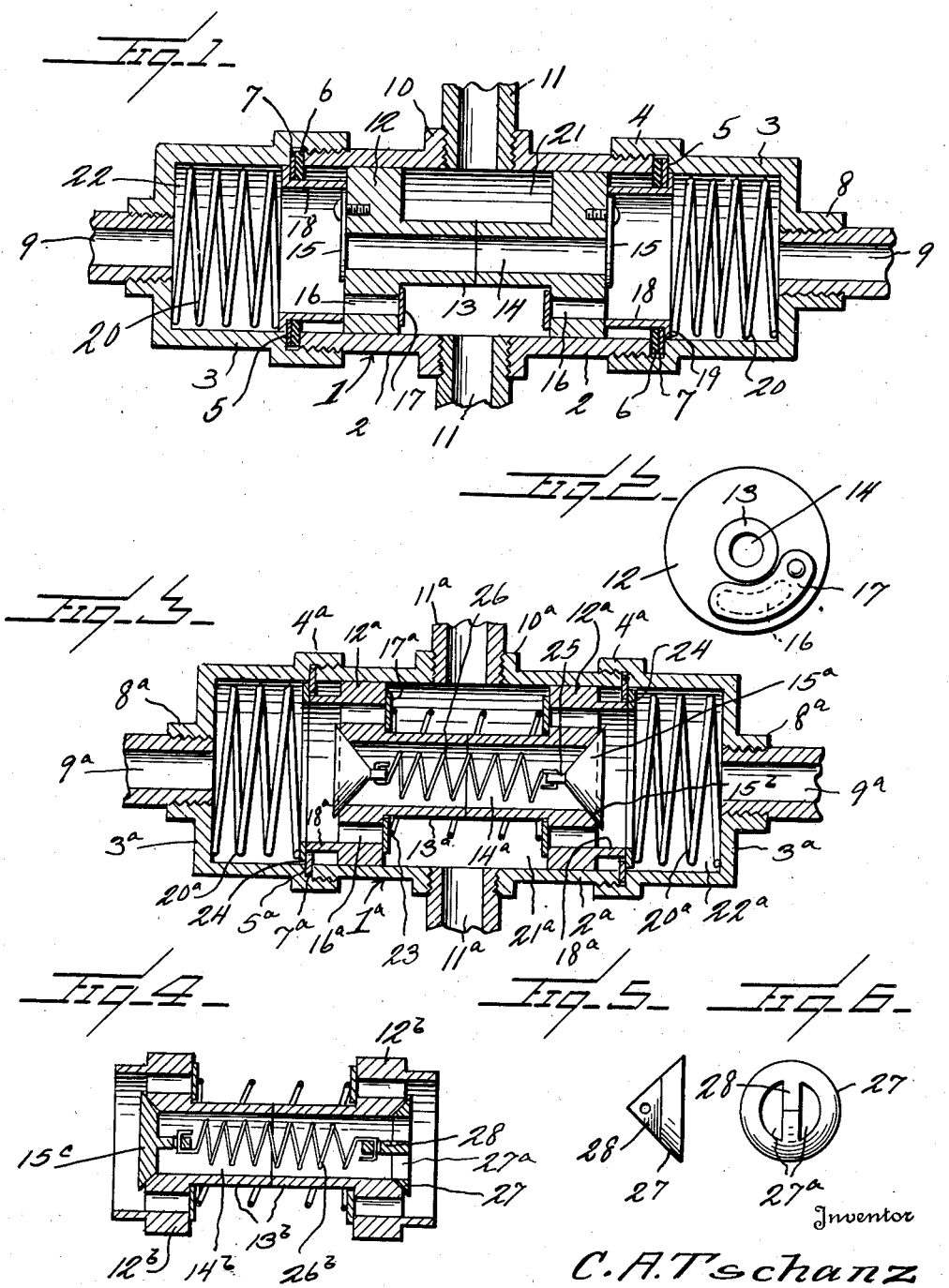

2,274,308

UNITED STATES PATENT OFFICE 2,274,308

MULTIPLE WAY FLUID CONTROL VALVE

Carl A. Tschanz, Norwood, Ohio

Application April 19, 1941, Serial No. 389,435

6 Claims. (Cl. 277—21)

This invention relates to the class of valves and the present application is directed particularly to a specific form of valve disclosed in my Patent No. 2,198,019, together with an improved form thereof.

The primary object of the present invention is to provide a novel valve which is designed to control the flow of fluid in a number of different directions betwen coupled pipe lines and particularly between pipe lines of an hydraulic spring stabilizing system such as is disclosed in my patent above referred to.

Another object of the invention is to provide a novel multi-way valve which is designed so that fluid under pressure from one pipe line will be automatically distributed through two divergent pipe lines or whereby such fluid, when flowing in the reverse direction from both of the divergent pipe lines, may be admitted to the first-mentioned pipe line, or when flowing in the reverse direction from one only of such divergent lines, may be compelled to flow into the other divergent line and will be shunted from the first-mentioned line.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in longitudinal section of one embodiment of the multiple way valve constructed in accordance with the present invention.

Fig. 2 is a view in elevation of the inner side of a piston.

Fig. 3 is a view in longitudinal section of another embodiment of the present valve structure.

Fig. 4 is a detailed fragmentary view of the valve structure shown in Fig. 3, illustrating a modification of one of the conical valve elements thereof.

Fig. 5 is a view in side elevation of the modified conical valve element.

Fig. 6 is a view in another position of the modified conical valve element showing the two ports therethrough.

Referring now more particularly to the drawing, Fig. 1 illustrates the form of the present valve as disclosed in my issued patent, such valve being located in the hydraulic stabilizing system in a position to distribute the fluid in a number of different directions in accordance with different phases of operation of the system. This valve comprises a main cylinder body indicated as a whole by the numeral 1 and comprising a cylindrical central section 2 and the cylindrical caps 3 threaded upon the ends thereof to make up the complete cylinder. These caps 3 are provided with the annular collars 4 at their inner ends which encircle the adjacent end of the central portion 2 and there is secured between the shoulder 5 at the inner end of each cap and the adjacent end of the central portion 2, a sealing ring 6 and a metallic stop ring 7. The interior diameter of each stop ring 7 is materially less than the interior diameter of the cylinder, as shown, for the purpose hereinafter set forth.

At the center of each cap 3 is a threaded nipple 8 with which is connected a fluid line 9. In the center of the central portion 2 of the cylinder is formed a threaded nipple 10 with which is connected an intermediate pipe 11.

Located within the central portion 2 of the cylinder are two pistons 12, each of which has a tubular stem 13 which opens through the piston, as shown, and these stems are in end abutting relation and function to maintain the pistons spaced apart. The tubular passages through the pistons and stems are indicated by the numeral 14 and upon the outer side of each piston is secured a flap valve 15 which covers the adjacent end of the passage.

Each of the piston bodies also has formed therethrough a port 16 which parallels the passage 14, and these ports are closed upon their inner sides or upon the inner sides of the pistons by the flap valves 17.

Upon the outer end of each piston 12 there is disposed a sleeve 18 which bears against the outer side of the piston and extends through the adjacent resilient and metallic rings 6—7, having formed upon its outer end the encircling flange 19 which abuts the adjacent stop ring 7 to limit the movement of the sleeve toward the transverse center of the cylinder.

The sleeves 18 are constantly urged toward one another and into contact with the adjacent pistons by the expansion springs 20 which are housed in the caps 3, the outer ends of the springs engaging the outer end walls of the caps and the inner ends of the springs engaging the flange 19 of the adjacent sleeve 18. By this means the pistons are also constantly urged together and when the two sleeves are moved inwardly or toward the transverse center of the cylinder as far as they are permitted to go by the stop rings 7, the opposing ends of the tubular stems 13 will be in abutting relation.

It will be seen from the foregoing that the pistons may move apart to permit fluid entering the central chamber 21, which is located between the pistons, from the pipe 11, to enter the tubular stems and flow through the same past the flap valves 15 into the end chambers 22 formed by the caps 3 and in which the springs 20 are housed. Thus fluid may be equally distributed to the lateral pipes 9. Also it will be seen that fluid entering both of the end chambers 22 from the two lateral pipes, if coming in under substantially the same pressure from the lateral pipes, will flow from the chambers 22 through the ports 16 into the central chamber 21 to discharge therefrom through the pipe 11. If fluid enters one end chamber 22 and the center chamber under pressure which may be greater than the pressure in the opposite end chamber, it cannot flow into the opposite end chamber due to the action of the valve 15 nearest the first end chamber and the valve 17 nearest the other or opposite end chamber, but there will merely be a shifting of the pistons toward the said opposite end chamber, the ends of the tubular portions 13 being maintained in abutting relation. If the pressure in the first end chamber is slightly greater than that in the center chamber then, of course, the valve 17 nearest the first chamber will open and allow some of the fluid to enter the center chamber, but with this arrangement, no fluid can pass directly from one end chamber to the opposite end chamber.

Fig. 3 illustrates a modified or improved form of the valve construction shown in Fig. 1. In this modified construction, the cylinder is indicated generally by the numeral 1a and is made up, like the cylinder 1, of a central cylindrical portion 2a and the end caps 3a, each of which has at its inner end the interiorly threaded flange 4a for engagement with an end of the central portion. At the point of joinder between the flange 4a and the body of the cap, there is formed a shoulder 5a and between this shoulder and the adjacent end of the central portion 2a is secured a stop ring 7a. Each of the caps 3a has a threaded nipple 8a in which is connected a fluid pipe 9a, and the central portion 2a of the cylinder likewise has a threaded nipple 10a in which is connected a fluid pipe 11a. Disposed within the central portion of the cylinder are the two pistons 12a, each of which has formed integrally therewith the tubular stem 13a through which is formed the passage 14a which passes through the adjacent piston. Each of these pistons has formed therethrough in parallel relation with the passage 14a, the fluid transfer ports 16a and upon the inner side of each piston there is disposed in encircling relation with the piston stem, the valve ring 17a which lies over and closes the ports 16a in the manner illustrated. These valve rings are maintained in closed position during the inoperative condition of the valve by the expansion spring 23 which encircles the stems 13a and presses the valve rings apart to keep them seated.

The outer end of each piston is provided with the exteriorly reduced sleeve extension 18a which passes through the adjacent stop ring 7a.

As in the form of the invention illustrated in Fig. 1, the area between the pistons forms a central chamber which is indicated here by the numeral 21a while the caps 3a provide outer fluid chambers 22a with which the pipes 9a communicate. Within each of the outer chambers 22a there is located an annulus 24 which rests against the end of the adjacent sleeve extension 18a and corresponds to the flange 19 of the structure of valve 1. Within each chamber 22a is housed a spring 20a which bears against the adjacent annulus 24 and constantly urges movement of the adjacent piston toward the transverse center of the cylinder. These springs, therefore, function to move the pistons together and to maintain the opposing ends of the tubular stems in end abutting relation. The inward movement of the rings 24 is limited by the stop rings 7a so that it will be seen that if by reason of the development of fluid pressure in the chamber 21a, one of the pistons should be moved outwardly against the tension of the adjacent spring 20a, the other piston will not be forced in toward the center of the cylinder by its control spring 20a since the extent of effective action of this spring is limited by the stop ring 7a.

Each end of the passage 14a which extends through the piston stems and the pistons, is closed by a conical valve 15a, the adjacent portion of the piston being reamed out to form the tapered valve seat 15b on which the valve is located. These valves at their apices have eyes 25 and these eyes are coupled together by a spring 26 which extends through the passage 14a and constantly urges the two conical valves onto their seats.

It will be seen that while certain details of construction of the valve just described are different from the valve 1, the function or operation will be the same in that a fluid entering chamber 21a may force the pistons 12a apart so as to separate the ends of the stems and flow in opposite directions through the stems past the valves 15a into the chambers 22a to enter the pipes 9a. As soon as the pressure in the central chamber is reduced to normal, the springs 20a will return the pistons to their centralized positions so as to bring the tubular stems together and close the passage 14a. If fluid enters the chambers 22a under equal pressure and such pressure exceeds the fluid pressure in the chamber 21a and the pipe 11a, the valve rings 17a will yield to open the ports 16a and the pistons will remain immovable. If, however, fluid should enter a chamber 22a and the chamber 21a from the pipe 11a while the fluid pressure is lowered in the opposite chamber 22a the same action will take place as previously described in connection with the valve structure shown in Fig. 1. By this, it is meant that since the purpose of the valve plates 15a is to prevent the flow of fluid from one end chamber to the other when there is a pressure produced in one end chamber and the middle chamber at the same time the greater pressure will determine the movement of the valve parts. If the pressure is greater in the middle chamber, then, of course, the stems will be separated to allow the fluid to pass through the stem opening and the fluid from the end chamber will be blocked due to the separation of the stems. However, if the pressure is greater in the one end chamber, the stems will remain in contacting relation and the fluid will unseat the plate 17a nearest the chamber in which the pressure is greatest to allow the fluid to pass through to the middle chamber, notwithstanding the pressure in this middle chamber. However, with the modified structure hereinafter described and illustrated in Fig. 4, the fluid in one end chamber is permitted to pass through the stem openings into the opposite end chamber while the pressure in the middle chamber separates the stems.

In certain uses of the present valve $1^a$ in an hydraulic stabilizing systems such as is shown in Patent No. 2,198,019, it is desirable to control the flow of fluid directly through the valve from one chamber $22^a$ to the opposite one without separation of the tubular stems $13^a$ but prevent flow of fluid in the opposite direction through the joined piston stems. In order that this action may take place, there is provided the modified conical valve construction shown in Fig. 4. In this figure, only the central portion of the valve unit is illustrated since the only change has to do with the conical valves, the remaining structure of the valve as a whole being unchanged. In this modified construction the pistons are indicated by the numerals $12^b$ and the stems therefor are indicated by the numeral $13^b$.

At one end of the passage $14^b$ which is formed through the stems, a solid conical valve $15^c$ is placed while at the opposite end of this passage there is employed a conical valve 27 through which are formed the ports $27^a$.

The valves $15^c$ and $27^a$ have the inwardly extending ears 28 which are coupled together by the spring $26^b$ which extends through the tubular piston stems. With this construction or with this form of ported valve at one end of the tubular passage, it will be seen that when fluid enters the end chamber nearest the ported valve 27, it may pass directly into the passage $14^b$ and out at the opposite end into the opposite end chamber, but the reverse flow of fluid directly through the passage $14^b$ cannot occur due to the use of the solid conical valve body $15^c$.

From the foregoing, it will be readily apparent that there is herein set forth a valve structure of novel form which, while it may be applicable to many systems, is particularly serviceable in an hydraulic stabilizing system of the character shown in my issued patent previously referred to.

What is claimed is:

1. A flow control valve of the character described, comprising a cylinder having end walls each provided with a fluid port, a pair of pistons disposed in the cylinder and each having a tubular stem, the passage of each stem extending through the adjacent piston, said stems being in opposed relation and coacting to maintain the pistons in spaced relation, a lateral port opening into the cylinder in the area between the spaced pistons, a valve upon the outer side of each piston and covering the adjacent stem passage, each of said pistons having a second passage therethrough at one side of the stem, valves upon the adjacent faces of the pistons each covering a second-mentioned passage, and spring members in the ends of the cylinder and bearing against the pistons to normally force the same together.

2. A flow control valve of the character described, comprising a cylinder having end walls each provided with a fluid port, means providing a fluid port adjacent the transverse center of the cylinder, a pair of pistons disposed in spaced relation upon opposite sides of the last-mentioned port, resilient means in each end of the cylinder urging said pistons toward one another, means interposed between the pistons for limiting the movement of the pistons together, valve controlled means forming a fluid passageway from one end of the cylinder to the opposite end through said pistons, said valve controlled means functioning to admit fluid from the space between the pistons into either end of the cylinder upon separation of the pistons, and valve controlled means for passing fluid from either end of the cylinder directly into the space between the pistons.

3. A flow control valve, comprising a cylinder having end walls, a pair of pistons disposed in spaced relation in the cylinder, said pistons being spaced from said end walls, there being a chamber upon the outer side of each of said pistons and a chamber between the spaced pistons, a fluid port opening into each of said first-mentioned chambers, a fluid port opening into the central chamber between the pistons, means limiting the separatory movement of the pistons in the cylinder, spring means normally urging said pistons together, opposed tubular stems carried by the pistons and having their opposed ends in abutting relation, the tubular stems opening through the pistons, valve elements closing the outer ends of the tubular stems and opening toward the adjacent ends of the cylinder, means normally urging said valve elements to closed position, said pistons having fluid transfer ports therethrough paralleling the stems, valve elements upon the opposing sides of the pistons closing said ports, and spring means interposed between the pistons and constantly urging the last-mentioned valve elements to closing position with respect to the adjacent ports.

4. A flow control valve, comprising a cylinder having end walls, a pair of pistons disposed in spaced relation in the cylinder, said pistons being spaced from said end walls, there being a chamber upon the outer side of each of said pistons and a chamber between the spaced pistons, a fluid port opening into each of said first-mentioned chambers, a fluid port opening into the central chamber between the pistons, means limiting the separatory movement of the pistons in the cylinder, spring means normally urging said pistons together, opposed tubular stems carried by the pistons and having their opposed ends in abutting relation, the tubular stems opening through the pistons, valve elements closing the outer ends of the tubular stems and opening toward the adjacent ends of the cylinder, means normally urging said valve elements to closed position, said pistons having fluid transfer ports therethrough paralleling the stems, valve elements upon the opposing sides of the pistons closing said ports, and spring means interposed between the pistons and constantly urging the last-mentioned valve elements to closing position with respect to the adjacent ports, one of said valve elements closing an end of a tubular stem being ported to allow fluid to pass from the adjacent end chamber into and through the stem past the opposing valve element and into the other end chamber of the cylinder.

5. A flow control valve of the character described, comprising a cylinder body having a central cylindrical portion and detachable end caps providing end walls, an annulus secured between each cap and the adjacent end of the central portion of the cylinder, said annulus extending into the cylinder and forming a stop, a pair of pistons disposed in spaced relation between said stops and limited thereby in their separatory movement, each of said pistons including a tubular stem which opens through the piston, said stems being in opposed abutting relation and limiting the movement of the pistons together, a sleeve upon the outer side of each piston and extending through the adjacent annulus, an expansion spring within each cap constantly exerting pressure upon the adjacent sleeve to urge the piston inwardly, a fluid port opening through each cap between the cap and the adjacent piston, a fluid port opening into the cylinder into the space between the opposing pistons, an outwardly opening valve closing each of the outer ends of the tubular stems, fluid ports through said pistons, and valve elements disposed between the pistons and closing said fluid ports against the passage of fluid through the ports in the direction of the adjacent caps.

6. A flow control valve of the character described, comprising a cylinder body having a central cylindrical portion and detachable end caps providing end walls, an annulus secured between each cap and the adjacent end of the central portion of the cylinder, said annulus extending into the cylinder and forming a stop, a pair of pistons disposed in spaced relation between said stops and limited thereby in their separatory movement, each of said pistons including a tubular stem which opens through the piston, said stems being in opposed abutting relation and limiting the movement of the pistons together, a sleeve upon the outer side of each piston and extending through the adjacent annulus, an expansion spring within each cap constantly exerting pressure upon the adjacent sleeve to urge the piston inwardly, a fluid port opening through each cap between the cap and the adjacent piston, a fluid port opening into the cylinder into the space between the opposing pistons, an outwardly opening valve closing each of the outer ends of the tubular stems, fluid ports through said pistons, valve elements disposed between the pistons and closing said fluid ports against the passage of fluid through the ports in the direction of the adjacent caps, said sleeves forming integral reduced extensions of the pistons, and an annulus disposed upon the outer side of each of said stops to bear upon the end of the adjacent sleeve and having the adjacent spring bearing thereagainst.

CARL A. TSCHANZ.